No. 760,857. PATENTED MAY 24, 1904.
J. E. DOWNER.
CAR WHEEL.
APPLICATION FILED FEB. 12, 1904.
NO MODEL.

Witnesses;
H. H. Clement
E. E. Potter

Inventor:
J. E. Downer.
By
Attorneys.

THE NORRIS PETERS CO., PHOTO-LITHO., WASHINGTON, D. C.

No. 760,857. Patented May 24, 1904.

UNITED STATES PATENT OFFICE.

JOSEPH E. DOWNER, OF ALLENPORT, PENNSYLVANIA.

CAR-WHEEL.

SPECIFICATION forming part of Letters Patent No. 760,857, dated May 24, 1904.

Application filed February 12, 1904. Serial No. 193,310. (No model.)

*To all whom it may concern:*

Be it known that I, JOSEPH E. DOWNER, a citizen of the United States of America, residing at Allenport, in the county of Washington and State of Pennsylvania, have invented certain new and useful Improvements in Car-Wheels, of which the following is a specification, reference being had therein to the accompanying drawings.

This invention relates to certain new and useful improvements in car-wheels, and has for its object to provide a car-wheel wherein all friction between the flange of said wheel and the rails is reduced to a minimum.

Another object of my invention is to provide a car-wheel the body portion of which is of the ordinary construction, and in the flanges thereof I form a groove in which ball-bearings are placed, whereby when the flanges of the wheel engage the rail the friction between said flanges and the rails will be reduced and the life of the flanges and of the rails will be considerably lengthened.

Briefly described, the invention comprises an ordinary car-wheel which when cast has an annular wedge-shaped groove formed in its flange, the open portion of said groove extending outwardly, whereby the same will engage the rails, and I provide an opening into said groove from the inner face of the wheel whereby a plurality of ball-bearings may be inserted which will engage the rail and prevent all wear of the flange and at the same time reduce the wear of the rail to a minimum.

With the above and other objects in view the invention consists in the novel construction, combination, and arrangement of parts to be hereinafter more fully described, and specifically pointed out in the claims.

In describing the invention in detail reference is had to the accompanying drawings, forming a part of this application, and wherein like numerals of reference indicate like parts throughout the several views, in which—

Figure 1:
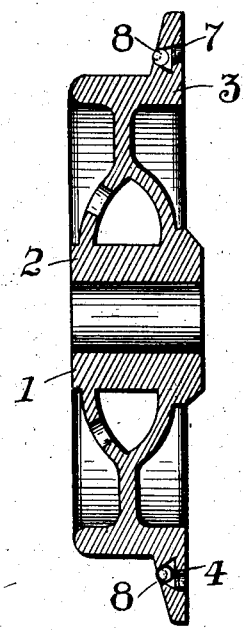
Figure 2:
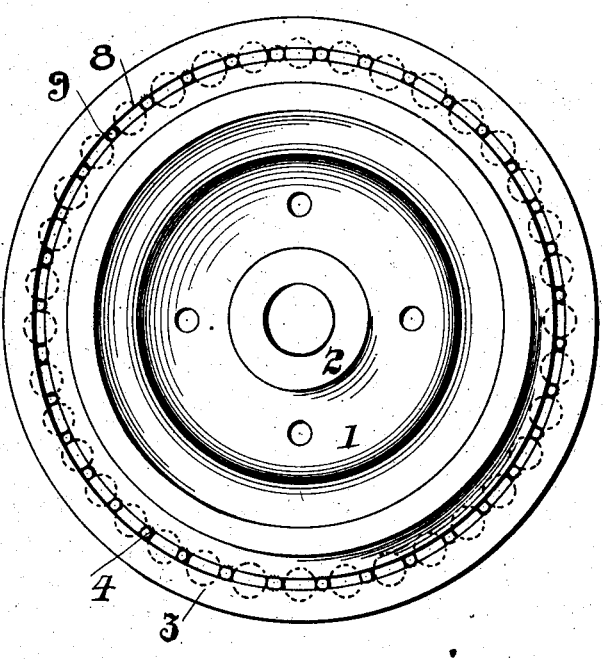
Figure 3:
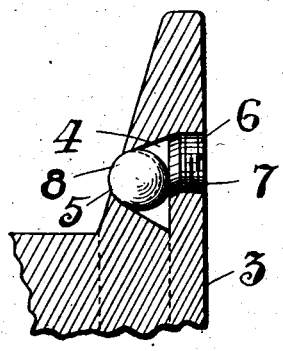

Figure 1 is a vertical sectional view of my improved wheel. Fig. 2 is a front view thereof. Fig. 3 is an enlarged detail sectional view of a portion of the flange.

In carrying out my invention I employ an ordinary car-wheel 1, having a hub 2 and an annular flange 3. When these wheels are cast, I form in the flange of the wheel an annular wedge-shaped groove 4, the open portion 5 of said groove being through the wall of the wheel-flange that lies adjacent the rail on which the wheel travels, and communicating with the groove 4 through the opposite side of the flange is an opening 6, and in said opening I secure a screw-threaded block 7. This opening is adapted to be used to place the ball-bearings 8 within the groove, and I preferably employ two sizes of ball-bearings, as illustrated in dotted lines in Fig. 2 of the drawings, and by experiments I have found it advantageous to place the small ball-bearings as indicated by the reference-numeral 9, between which one of the larger ones, 8, is placed. In constructing this wheel to reduce the friction between the flange and the rail-head this groove has been provided, which may be readily cast therein when the wheel is being formed, and where this annular flange carried by the wheel has become worn in advance of the body portion of the wheel it will be seen by placing these ball-bearings within the flange that the life of the flange will be lengthened and that where so much friction has been occasioned when the rolling-stock travels around a curve that this friction will be greatly reduced and the life of the rails will be considerably lengthened. By interposing the smaller-size balls between the larger-size balls 8 all frictional engagement between the larger-size balls one with the other is eliminated, all the engaging faces of the larger balls moving in the same direction, and thereby reducing friction and decreasing the wear on the balls. The points of contact of the larger balls with the walls of their groove are also decreased in area by the substantial wedge shape of this groove, as described, thus further tending to reduce friction and wear and increase the life of the balls.

It will be obvious that various slight changes may be made in the details of construction without departing from the general spirit of my invention.

Having fully described my invention, what I claim as new, and desire to secure by Letters Patent, is—

1. A car-wheel having a tread and a flange, said flange having an annular wedge-shaped groove open throughout the face of the flange on one side of the latter, and ball-bearings of alternate large and small diameter within the groove with the larger-diameter balls protruding through the open side of the flange.

2. A car-wheel having a tread and a flange, said flange having an annular groove open throughout the face of the flange on one side of the latter, and ball-bearings of alternate large and small diameter arranged in said groove.

3. A car-wheel having a tread and a flange, said flange having an annular groove wedge-shaped in cross-section and opening through one side wall of the flange, ball-bearings arranged in said groove and protruding through the groove, the opposite side of the flange having an opening through which the balls are introduced into the groove, and a plug threaded into the opening for closing the same, substantially as described.

In testimony whereof I affix my signature in the presence of two witnesses.

JOSEPH E. DOWNER.

Witnesses:
A. K. YOUNG,
FRANK FLICKINGER.